United States Patent

Benson et al.

[11] Patent Number: 5,384,653
[45] Date of Patent: Jan. 24, 1995

[54] STAND-ALONE PHOTOVOLTAIC (PV) POWERED ELECTROCHROMIC WINDOW

[75] Inventors: David K. Benson, Golden; Richard S. Crandall; Satyendra K. Deb, both of Boulder; Jack L. Stone, Lakewood, all of Colo.

[73] Assignee: Midwest Research Institute, Kansas City, Mo.

[21] Appl. No.: 972,242

[22] Filed: Nov. 6, 1992

[51] Int. Cl.⁶ ............................................. G02F 1/153
[52] U.S. Cl. ..................... 359/270; 359/275; 359/265; 52/204.593; 52/204.595
[58] Field of Search ............... 359/260, 265, 220, 275; 52/398, 399

[56] References Cited

U.S. PATENT DOCUMENTS

| | | | |
|---|---|---|---|
| 3,899,858 | 8/1975 | Zanker | 52/398 |
| 4,475,031 | 10/1984 | Mockovciak, Jr. | |
| 4,641,922 | 2/1987 | Jacob | |
| 4,768,865 | 9/1988 | Greenberg et al. | |
| 4,832,468 | 5/1989 | Ito et al. | |
| 4,872,745 | 10/1989 | Fujisawa et al. | |
| 4,906,075 | 3/1990 | Matsumiya et al. | |
| 4,958,917 | 9/1990 | Hashimoto et al. | |
| 5,069,535 | 12/1991 | Baucke et al. | 359/273 |
| 5,097,358 | 3/1992 | Ito et al. | 359/273 |
| 5,111,329 | 5/1992 | Geajewski et al. | 359/260 |
| 5,136,419 | 8/1992 | Shabrang | 359/265 |
| 5,228,925 | 6/1993 | Nath et al. | |

Primary Examiner—Loha Ben
Assistant Examiner—Thomas Robbins
Attorney, Agent, or Firm—Ken Richardson; Edna M. O'Connor

[57] ABSTRACT

A variable transmittance double pane window includes an electrochromic material that has been deposited on one pane of the window in conjunction with an array of photovoltaic cells deposited along an edge of the pane to produce the required electric power necessary to vary the effective transmittance of the window. A battery is placed in a parallel fashion to the array of photovoltaic cells to allow the user the ability to manually override the system when a desired transmittance is desired.

17 Claims, 8 Drawing Sheets

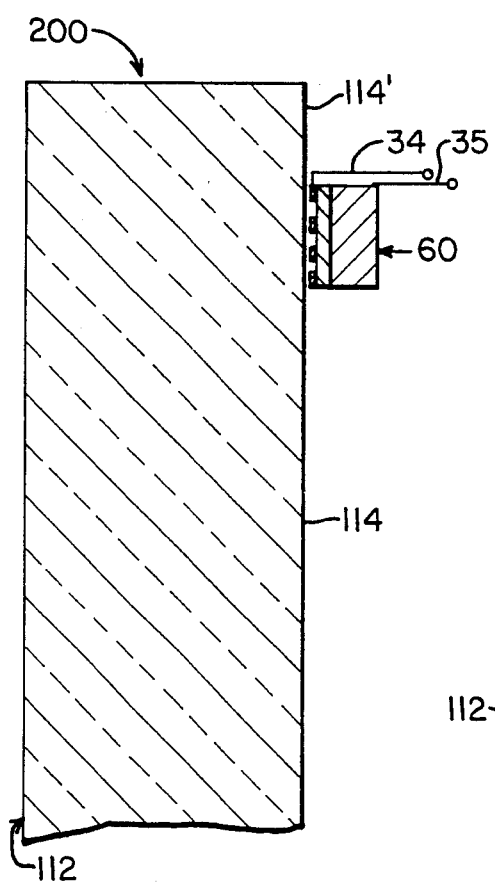
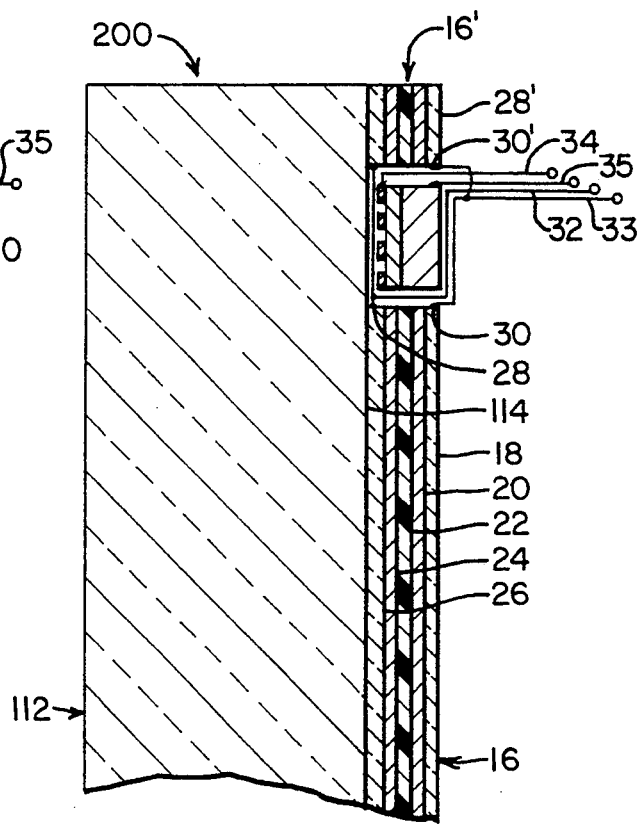
FIG. 10
FIG. 11

STAND-ALONE PHOTOVOLTAIC (PV) POWERED ELECTROCHROMIC WINDOW

CONTRACTUAL ORIGIN OF THE INVENTION

The United States Government has rights in this invention under Contract No. DE-AC0283CH10093 between the U.S. Department of Energy and the National Renewable Energy Laboratory, a Division of Midwest Research Institute.

BACKGROUND OF THE INVENTION

1. Field of Invention

The present invention relates to energy-saving windows, and more particularly to an apparatus for varying the light transmittance of window glazing.

2. Description of the State of the Art

Presently there exists approximately 19 billion square feet of windows in commercial and residential buildings, and another 600 million square feet of windows are being installed in new buildings throughout the United States each year, culminating in enormous cost and energy demands for air conditioning to negate unwanted solar heat gains through these windows. Static solar gain control coatings can be applied to windows; however, this practice is disadvantageous in that sunlight is blocked even when it is needed for lighting and heating during cold weather.

There have been some apparatus and methods developed for controlling the transmittance of light through window panes. For example, U.S. Pat. No. 4,768,865 to C. Greenberg et al., discloses a conventional electrochromic film on a window that is responsive to the application of an electric field to change from a high-transmittance, non-absorbing state to a lower-transmittance, absorbing or reflecting state. The Ito et al. patent, U.S. Pat. No. 4,832,468, discloses the use of an electrochromic coating for dimming automobile windows, including a plurality of solid electrochromic elements arranged in a horizontal abutting fashion and adhered to the glass window, each element being controllable independently of the others. C. Hashimoto et al., in his U.S. Pat. No. 4,958,917, discloses a specialized combination of two electrochromic cells which, together, are capable of reducing the transmittance of visible light to less than the usual lower limit of 7% for known electrochromic coatings.

While Greenberg, Ito, and Hashimoto teach the use of electrochromic coatings or controlling the transmittance of light through window panes, these coatings require external power supplies and, to be practical, the need for wiring into a building's electrical system. These coatings also absorb substantial mounts of the incident light and then radiate large amounts of the absorbed energy as heat to the interiors of the buildings in which they are installed, thus decreasing the effectiveness of the devices for blocking heat gain in the buildings and partially defeating the purpose for which they are used.

I. Mockovciak, in his U.S. Pat. No. 4,475,031, disclosed a self-contained sun-sensitive window made up of liquid nematic crystals (LC), sandwiched between two transparent sheets and powered directly by a solar cell. Liquid nematic crystals, however, are not effective in blocking heat radiation. Rather, they merely scatter light, thus making a window translucent, but not effectively blocking heat gain from the sun's rays. A further disadvantage of such liquid nematic crystal technology is that a constant source of energy is required to change the translucence of the window, thus requiring a substantial and continuous source of electric power as long as transparency instead of translucence is desired.

SUMMARY OF THE INVENTION

Accordingly, it is a general object of this invention to provide a variable transmittance window that does not require an external power supply.

A more specific object of the present invention is to provide a variable transmittance window that further decreases the amount of radiant energy transmitted through a window.

Another specific object of the present invention is to provide a variable transmittance window that can be activated and deactivated with consumption of power only at the transition between the activated state and the deactivated state or vice versa, but without requiring power to maintain it in either state after a transition from one state to the other.

Additional objects, advantages and novel features of this invention shall be set forth in part in the description that follows, and in part will become apparent to those skilled in the art upon examination of the following or may be learned by the practice of the invention or may be realized and attained by means of the instrumentalities and in combinations particularly pointed out in the appended claims.

To achieve the foregoing and other objects and in accordance with the purposes of the present invention, as embodied and broadly described herein, the apparatus of this invention may comprise two glass plates spaced apart in a parallel relationship to one another and forming an air tight cavity there between. The surface of one glass plate facing the cavity has deposited on it a coating comprising an array of photovoltaic cells in conjunction with electrochromic material. This coating may also be connected in parallel to a battery as an alternate power source. Another structural embodiment includes the same coating as discussed above deposited on a thin, flexible, transparent polymer material. The polymer material may then be adhesively applied to existing windows.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the drawings

FIG. 10 is a cross-sectional view taken along the lines 10—10 of FIG. 9 showing a third embodiment with an array of photovoltaic cells deposited around the perimeter of the thin, transparent, flexible polymer material; and FIG. 11 is a cross-sectional view taken along the lines 10—10 of FIG. 9 showing a third embodiment, further having electrochromic material deposited on the remaining surface of the thin, transparent, flexible polymer material, shown in FIG. 10, and wired to the array of photovoltaic cells.

DETAILED DESCRIPTION OF THE PREFERRED EMBODIMENT

Figure 1:
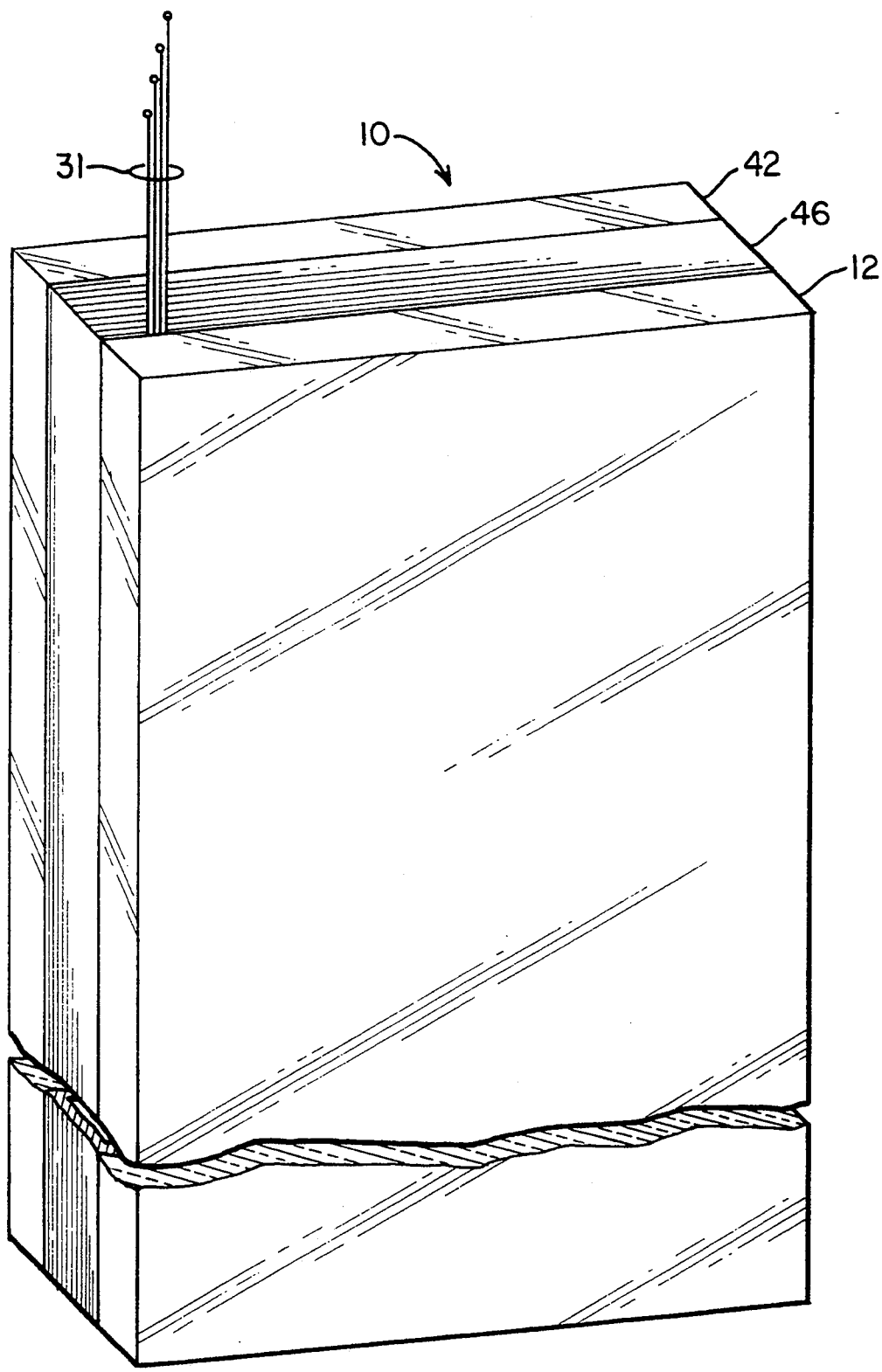
FIG. 1 is a perspective view of the photovoltaic powered electrochromic window of the present invention.
Figure 2:
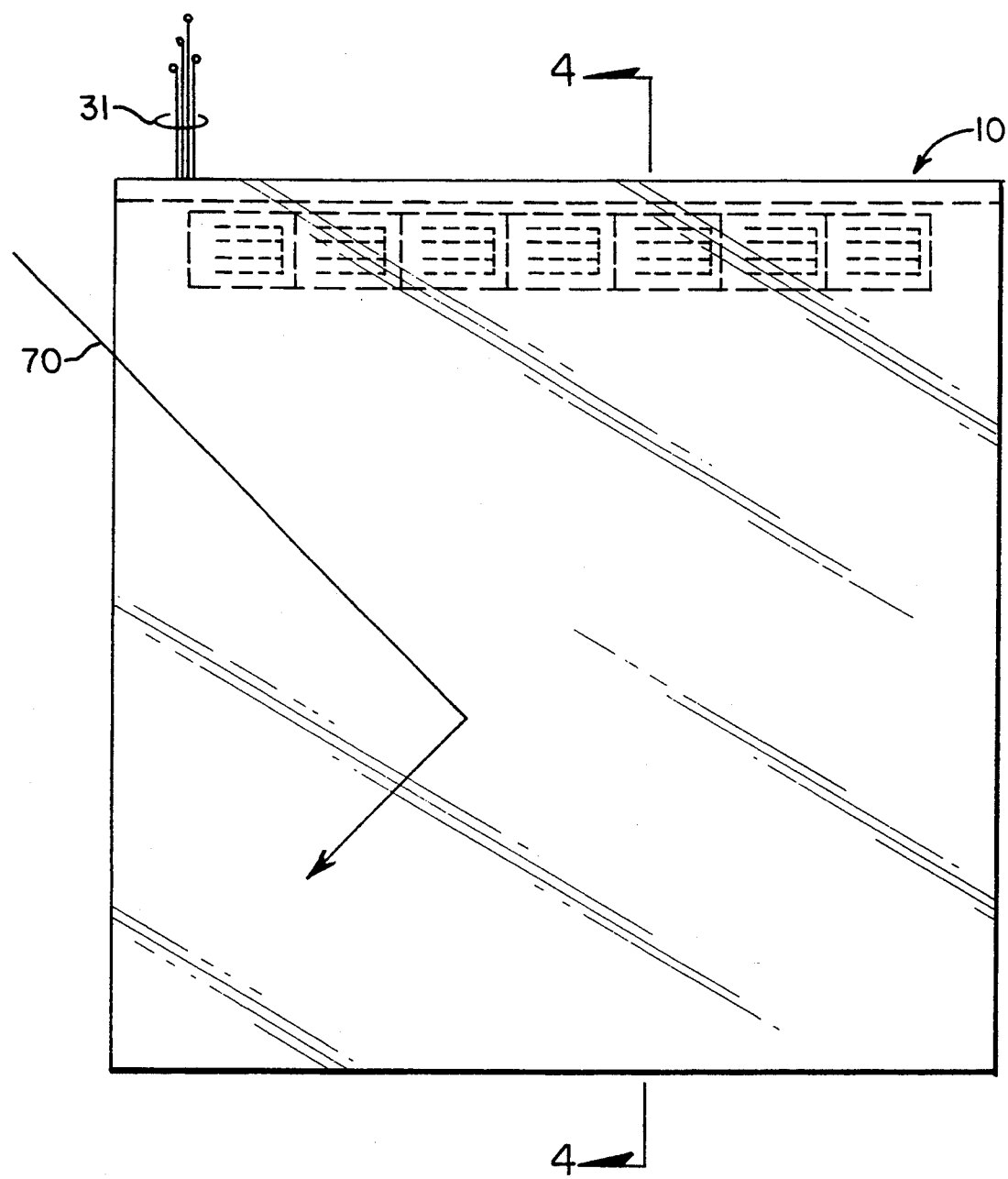
FIG. 2 is an elevation view of a first embodiment of the photovoltaic powered electrochromic window of the present invention, having an electrochromic material and an array of photovoltaic cells deposited on a transparent substrate.
Figure 3:
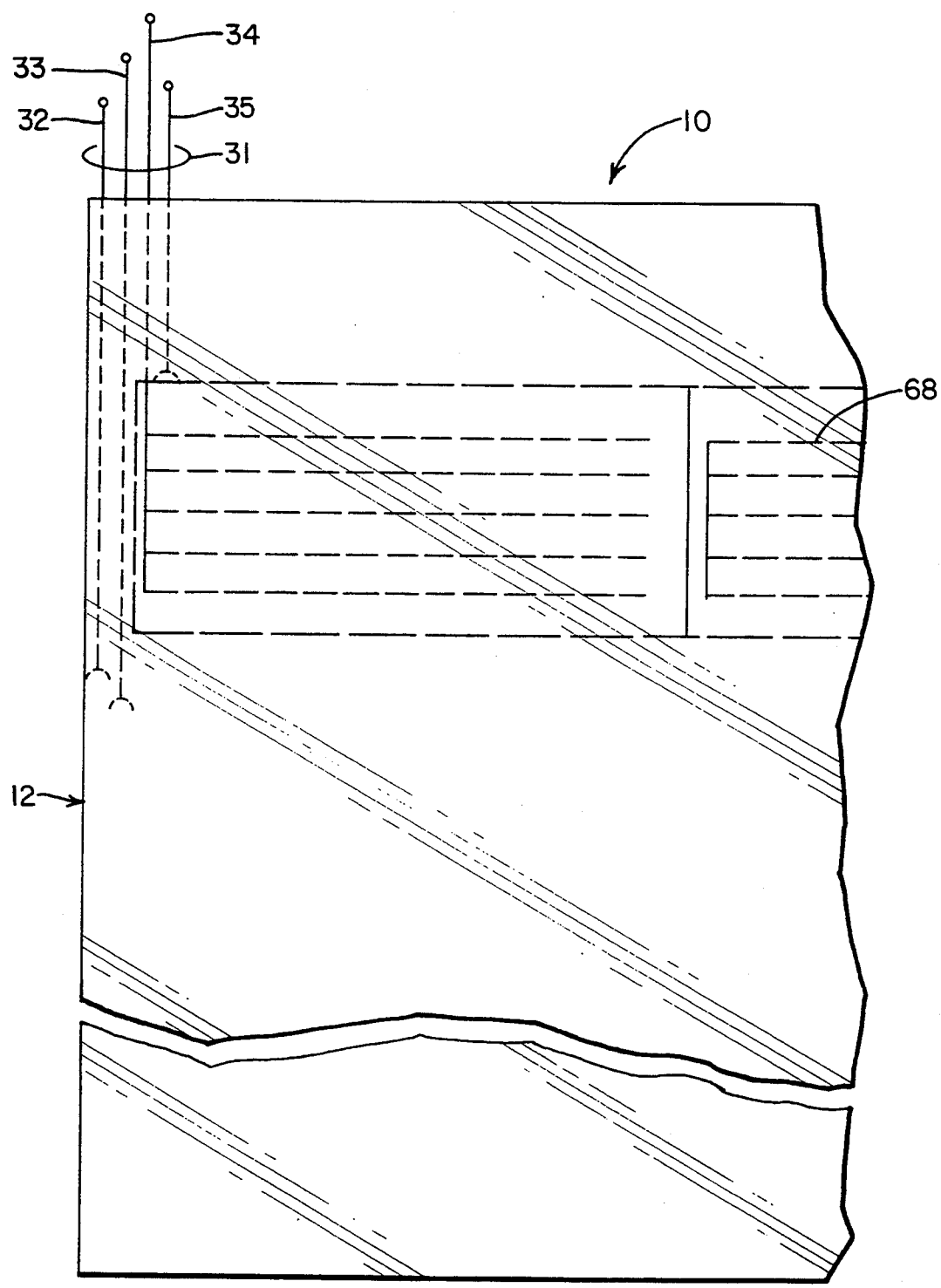
FIG. 3 is an enlargement of a portion of FIG. 1 showing the array of photovoltaic cells and the associated leads according to the first embodiment of this invention.

The stand-alone photovoltaic powered electrochromic window 10 assembly according to the present invention is best seen in FIGS. 1-4. The window assembly 10 is comprised of two plates 12 and 42 of glass or other transparent material are placed parallel and spaced apart in relation to one another, separated by spacers 46 and sealed around their peripheral edges to form an air tight cavity 50 between plates 12 and 42. Deposited on the inside surface 14 of glass plate 12 and facing cavity 50 is an array 60 of photovoltaic cells and an electrochromic coating 16. The array 60 of photovoltaic cells and a battery 36 (not shown in FIGS. 1-4, but described below) are connected in parallel to electrochromic coating 16 via appropriate switching (not shown in FIGS. 1-4, but described below) to allow selective activation of the electrochromic coating 16 to either a substantially transparent state or a substantially opaque state. It can also be set for any desired state of partial transparency or opacity between those two limits.

When the electrochromic coating 16 is in the substantially transparent state, radiation 70 from the sun is substantially transmitted through both plate 12 and plate 42 of window assembly 10 into the interior of the building. Of course, some amount of the radiation 70 is always reflected and some is absorbed by the plate 12 and 42, but, with the electrochromic coating 16 in the substantially transparent state, most of the radiation 70 in the near infrared, visible light, and ultraviolet portions of the spectrum is admitted into the interior of the building. Inside the building, the sun's radiation 70, of course, provides light and is eventually absorbed by interior walls, floors, furnishings, and the like, where the electromagnetic radiation is converted to heat energy. In colder ambient weather conditions, such heat inside the building is, of course, usually desired and welcomed. However, in hotter ambient weather conditions, it is not desired and often has to be dissipated or removed by ventilation, air conditioning, or the like to maintain the interior of the building at temperatures that are comfortable to humans.

The window assembly 10 of the present invention is effective in substantially decreasing such undesirable heat gain inside a building from the sun's radiation by a combination of features. The electrochromic coating 16 on the inside surface 14 of exterior plate 12 of the window assembly 10 can be changed to its substantially opaque state, thus blocking rather than transmitting the sun's radiation. With most of the sun's radiation blocked in this manner, it does not reach the interior of the building to be absorbed and converted to interior heat. Instead, a substantial amount of the radiation is either reflected or absorbed by the electrochromic coating 16. At the same time, however, inside plate 42 and sealed space 50 prevent heat energy from the light radiation absorbed by coating 16 from being transmitted into the building interior by either conduction or convection. The glass of interior sheet 42 does not transmit significant amounts of infrared radiation, thus blocking heat entry by radiation, and the space 50 is sized wide enough to minimize molecular conduction of heat, but narrow enough to prevent convection. At the same time conduction of heat by the exterior plate 12 from the electrochromic layer 16 and infrared radiation, as well as ambient air and convection or breeze currents adjacent to the outside surface of plate 12, will dissipate the absorbed heat energy to the exterior atmosphere. Therefore, this combination and design of window apparatus 10 are very effective at blocking energy from the sun from entering the building through a window.

Of course, as mentioned above, when heat gain in the building is desired, the electrochromic coating 16 can be changed back to its substantially transparent state to admit the sun's radiation into the building. Of course, as mentioned above, the extent of opacity or transparency of the electrochromic coating 16 can be varied and set at any desired state between the two limits, so, for example, enough light can be admitted to be able to see through the window assembly 10 while minimizing the mount of energy transmitted.

Figure 4:
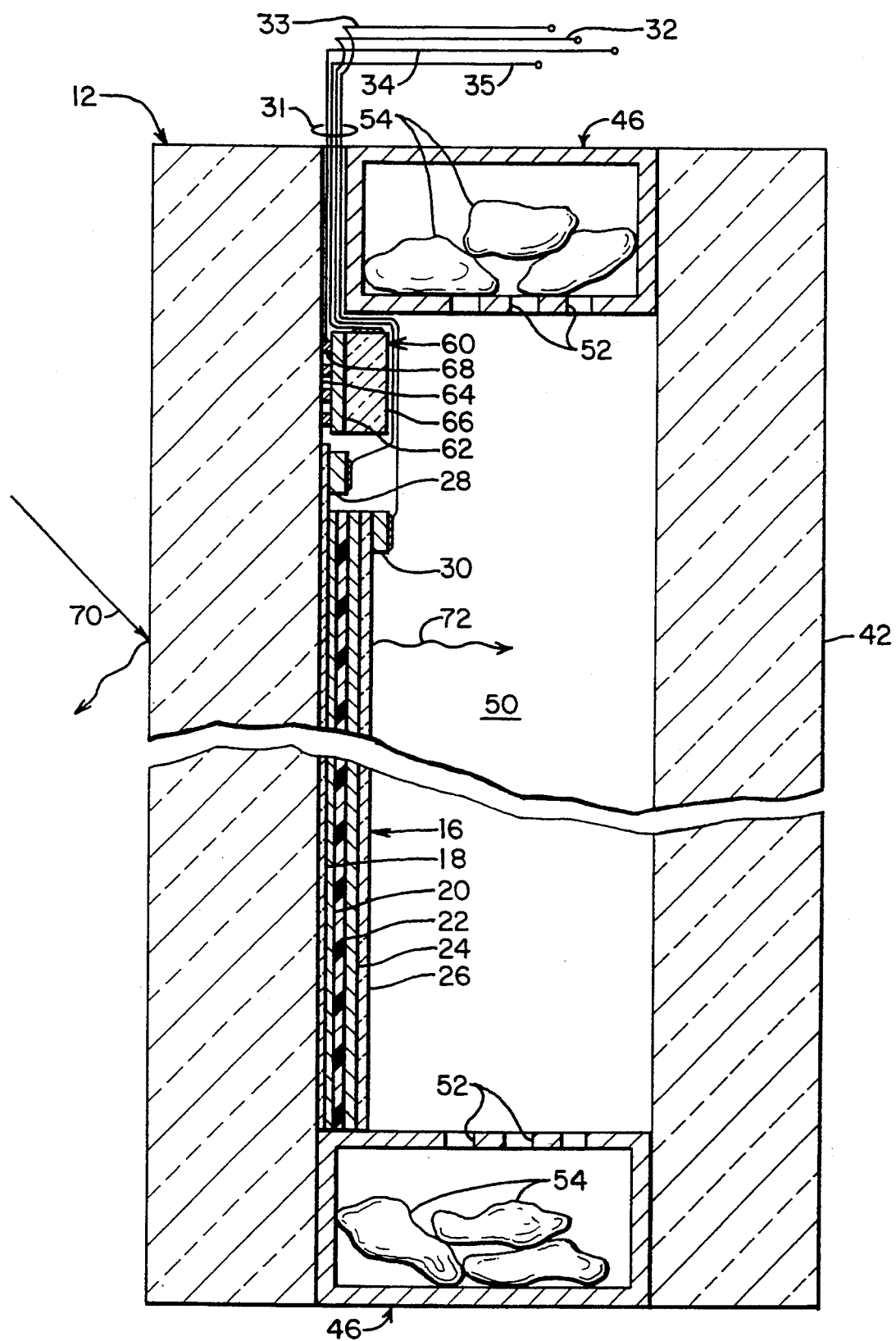
FIG. 4 is a cross-sectional view taken along line 4—4 of FIG. 2 showing a first embodiment electrochromic layer and photovoltaic structure of the stand-alone photovoltaic powered electrochromic window.

Referring now primarily to FIG. 4, the stand-alone photovoltaic powered electrochromic window 10 according to the present invention also includes an array of photovoltaic cells 60 of a type well known in the art, deposited on the inner surface 14 of the glass plate 12 or other transparent substrate. In accordance with standard practice, an n-type conductivity region 62 is created on the front side 64 of a p-type polycrystalline silicon substrate 66. A plurality of front surface metallic contacts 68 are disposed on the front surface 64 and adjacent to the inner surface 14 of glass plate 12. Both the front surface 64 and metallic contacts 68 are covered by an anti-reflective coating (not shown). Each solar cell is connected in a series/parallel manner to the others to form a photovoltaic array 60.

An electrochromic (EC) coating 16 is deposited on the substrate 12 immediately adjacent to photovoltaic array 60 and substantially covering the remaining inner surface 14. Electrochromic coating 16 can be composed of five layers, including two transparent electrically conductive layers (TE) 18 and 26, which function as electrodes; an electrochromic layer 20; an ion-conductive electrolyte layer 22; and an ion storage layer 24 or counter-electrode layer.

Generally, the EC coating 16 is deposited on the inner surface 14 of glass plate 12 one layer at a time, such as by physical vapor deposition, sputtering, chemical vapor deposition, i.e., heat stimulated or radio frequency discharge or the like. For example, the first layer deposited on the substrate 12 can be the transparent conductor (TE) layer 18 made of highly doped metal oxides, such as tin oxide, zinc oxide, indium oxide, or mixtures thereof. This TE layer can be about 1000 to 5000 angstroms thick. An electrochromic (EC) layer 20 is next deposited on the TE layer 18. An electrochromic material is one that takes on or losses a color, i.e., becomes opaque or transparent, in response to an electric potential or current therethrough. Typical examples of EC materials or so-called cathodic electrochromic materials, which take on color in a reduced state, which can be induced by a DC electric current, include $WO_3$, $MoO_3$, $TiO_2$, $U_2O_5$, $Bi_2O_3$, $PbO_2$, and $CuO_x$. This EC layer can be about 1000 to 5000 angstroms thick. An ion-conductive electrolyte layer 22 can then be deposited on the EC layer 20. Electrolyte layer 22 may be a liquid, a polymer gel, or a solid film. For most applications, the liquid electrolyte is not practical. Polymer gels in which the polymer acts like a sponge to hold the liquid electrolyte may be practical when the polymer gel is also used as the bonding layer between two sheets of glass or two sheets of plastic onto which the other layers have been deposited. Typical polymer gels are made of polyethylene oxide, polypropylene oxide, or a silicone imbibed with a lithium salt solution such as lithium perchlorate dissolved in propylene carbonate. Solid thin film electrolytes are made of so-called fast-ion conductor materials in which either lithium or hydrogen ions diffuse readily. Examples of such fast-ion conductor materials include $Li_3N$, $Li_2NH$, and $Li_{1-x} M_x Ti_{2-x} (PO_4)_3$, where M represents another metal, such as aluminum, chromium, gallium, or the like. A solid thin film electrolyte layer 22 may be, for example, 1000 to 5000 angstroms thick. Next, the ion storage layer 24 is deposited on the electrolyte layer 22. The materials used in this ion storage layer 24 can be a complementary electrochromic material, or anodic electrochromic materials which take on color in an oxidized state. A typical example of such a material is Prussian blue, and other practicable examples include $Ni(OH)_2$, $IrO_2$, and $CuO_x$. This ion storage layer 24 can be about 1000 to 5000 angstroms thick. Finally, a second transparent electrically conductive layer 26 is deposited for the second electrode, thus completing electrochromic (EC) coating 16.

Figure 5:
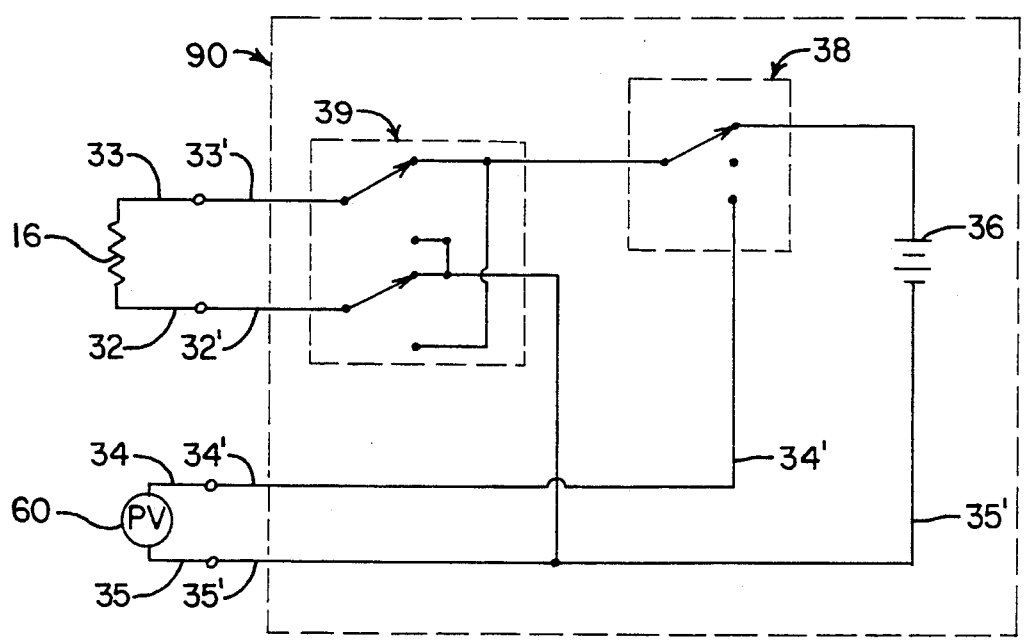
FIG. 5 shows a circuit diagram for an electrochromic device operated by either a photovoltaic cell or by a battery.
Figure 6:
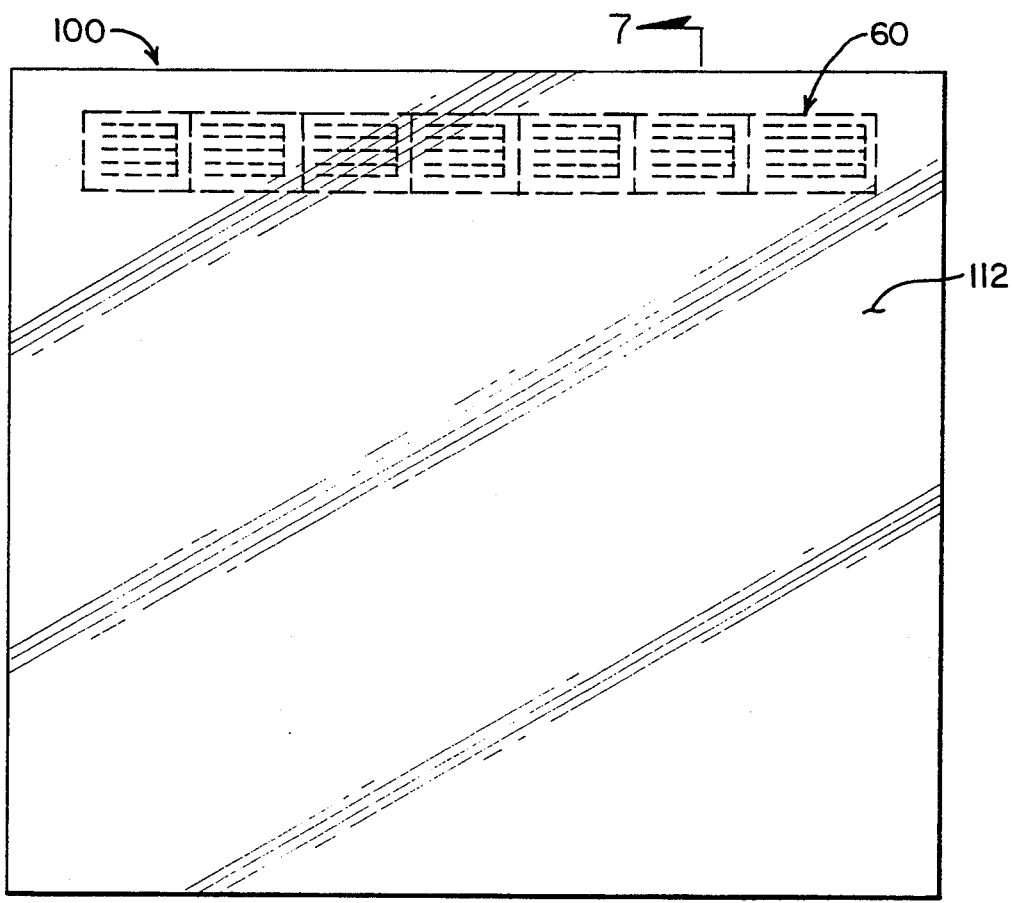
FIG. 6 is an elevation view of the second embodiment having an array of photovoltaic cells and electrochromic material deposited directly on a thin, transparent, flexible polymer material producing an integral coating which may be adhesively applied to existing windows.

Two leads 32 and 33 are connected respectively to the transparent conducting electrode layers 18 and 26 to provide the electric potential and circuit across the EC coating 16, which is necessary to cause the EC coating 16 to convert from transparent to opaque and vice versa The leads 32 and 33 are in turn connected to polarity reversing switch 39 housed within control box 90, as illustrated in FIG. 5. Switch 39 allows for the polarity of the charge across the EC coating 16 to be reversed, thereby changing the opacity of the EC coating 16, as discussed in more detail below. A power source selection switch 38 is connected in series to polarity reversing switch 39. The two alternate power sources available to operate the present invention are a battery 36, also housed within control box 90, and the array of photovoltaic cells 60, which are connected in parallel with the EC coating 16. Switch 38 is used to select between these two alternate power sources 36 and 60. Leads 34 and 35, which are connected to the array of photovoltaic cells 60, are then connected to leads 34' and 35' originating in control box 90 to complete the circuit, as shown in FIG. 5.

The second or interior glass plate 42 or other transparent material is placed parallel and spaced apart in relation to exterior glass plate 12. This spatial separation between plates 12 and 42 is maintained by aluminum spacer 46 around the perimeter edges of plates 12 and 42, thereby forming an air tight chamber 50 between plates 12 and 42, which encloses EC coating 16. Aluminum spacer 46 functions not only to maintain glass plates 12 and 42 in a spaced apart relation, but also as a container for a desiccant material 54. The desiccant material 54 is in communication with chamber 50 through apertures 52, so it can absorb any water vapor within chamber 50, thus retarding the formation of condensation on the inside surfaces of glass plates 12 and 44.

In operation, the array of photovoltaic cells 60 outputs a DC electric current in proportion to the intensity of the sunlight 70 incident upon it. The DC voltage produced by the photovoltaic array 60 is then applied between TE layers 18 and 26 of EC coating 16, which serve as the positive and negative electrodes, respectively. As the voltage is applied across the two electrodes 18 and 26, ions are removed from the counter-electrode 24, conducted through the ion-conducting layer 22, and inserted into the electrochromic material 20, so that the two layers 24 and 20 are simultaneously oxidized and reduced, respectively. In this "on" state, both materials 24 and 20 become more opaque. When the desired light transmittance level or opaqueness is reached, switch 38 can be mined to an "off" position, thus removing the voltage being applied. When there is no voltage across the EC coating 16, it will hold whatever state of opacity or transparency it was in when the voltage was removed. Over time the ions will migrate back to their original state without the assistance of electric voltage, thus increasing the transparency of the EC coating 16. However, migration is a very slow process, and, for practical purposes a voltage is not required to maintain an opaque state.

When the EC coating 16 of the present invention is turned "on," i.e., opaque, most of the solar energy is absorbed and radiated or conducted back toward, the exterior, as described above. A small percentage of solar heat 72 can, however, reach chamber 50. However, because chamber 50 is quite narrow, preferably about 10 to 15 mm, very little convection occurs in air tight chamber 50, thus a negligible amount of heat reaches the interior of the building. Reversing and applying the DC polarity across TE layers 18 and 26 by way of switch 39 causes a reversal of the electrochromic properties, and the EC coating 16 reverts to its high transparency or radiation transmittance state. Switch 38 can also activate battery 36 as an alternate power source when the conditions are such that the incident sunlight 70 is not sufficient for the photovoltaic array 60 to produce energy. The photovoltaic array 60 can also be used to charge the battery 36 when not otherwise in use. Since electric power is only required during transition from one state of opacity or transparency to another, but not to hold any particular state, this combination window assembly 10 provides a very effective, controllable, yet efficient energy-saving apparatus that is self-contained and operates to reduce or enhance heat gain in a building with no need for an external power source.

In alternate embodiments 100 and 200, as shown in FIGS. 7-11, the array of photovoltaic cells 60 and electrochromic coating 16 are deposited on a thin, flexible, transparent polymer material 112, as opposed to a glass sheet 12 as in the preferred embodiment 10, thus forming an integral photovoltaic powered electrochromic film 100 that can be applied adhesively to the inner surface of existing windows.

Figure 7:
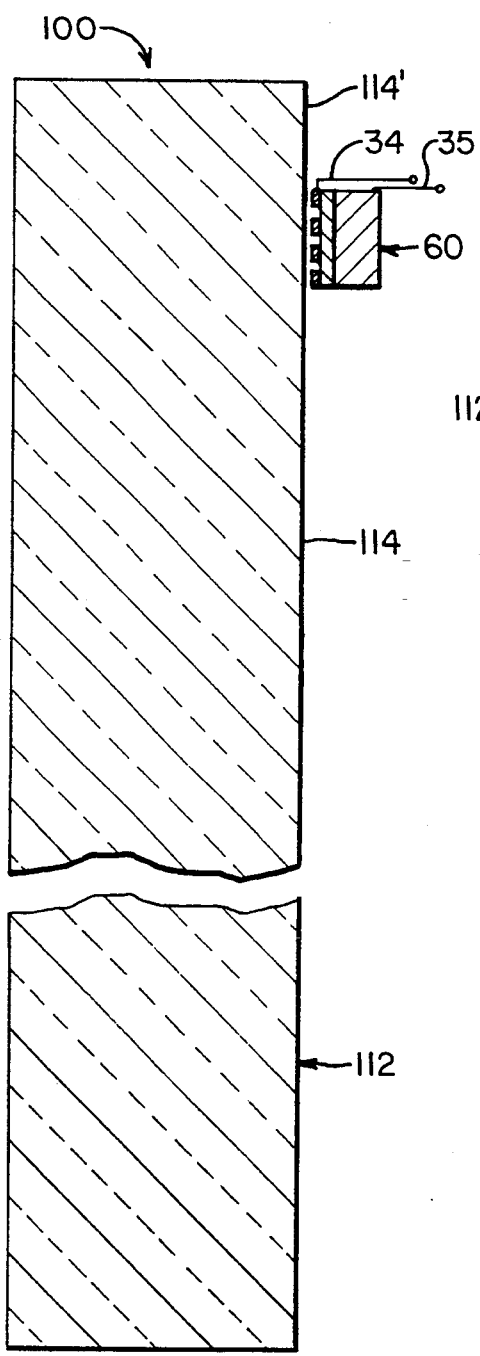
FIG. 7 is a cross-sectional view taken along the lines 7—7 of FIG. 6 showing a second embodiment having an array of photovoltaic cells and electrochromic material deposited on a thin, transparent, flexible material.
Figure 8:
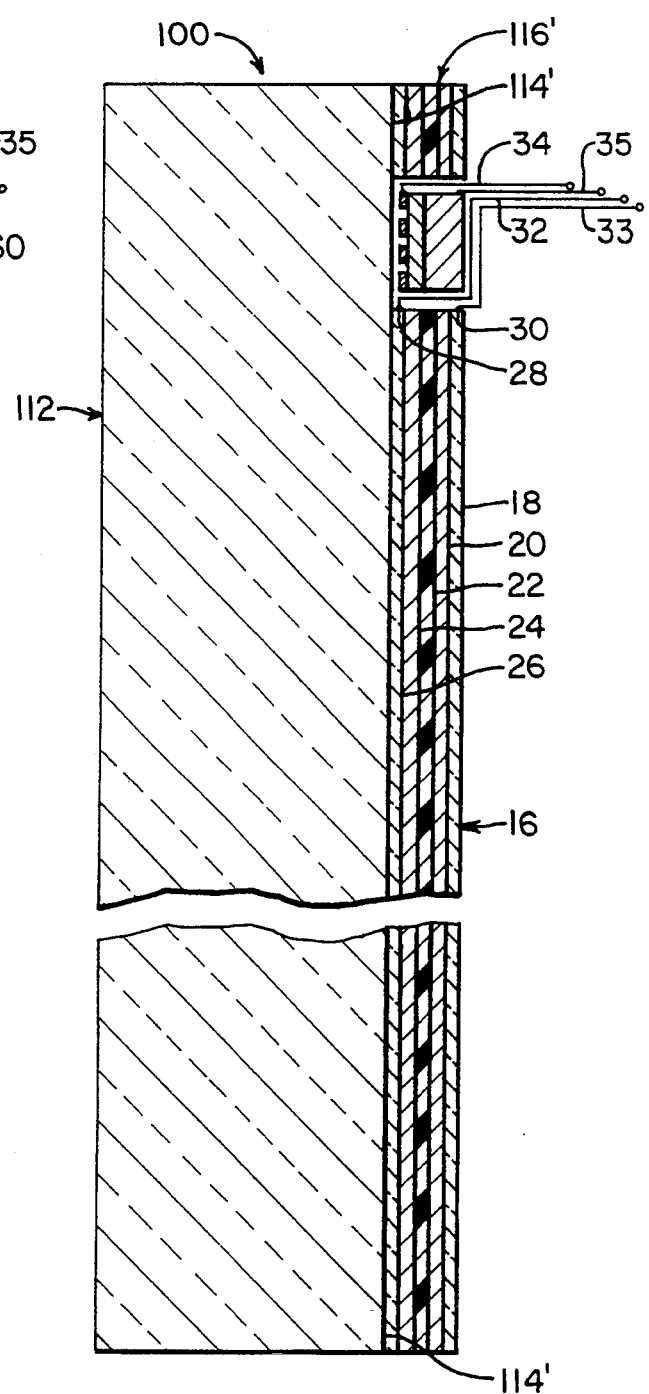
FIG. 8 is a cross-sectional view taken along the lines 7—7 of FIG. 6 showing the integral coating of the second embodiment of having electrochromic material deposited surrounding an array of photovoltaic cells.
Figure 9:
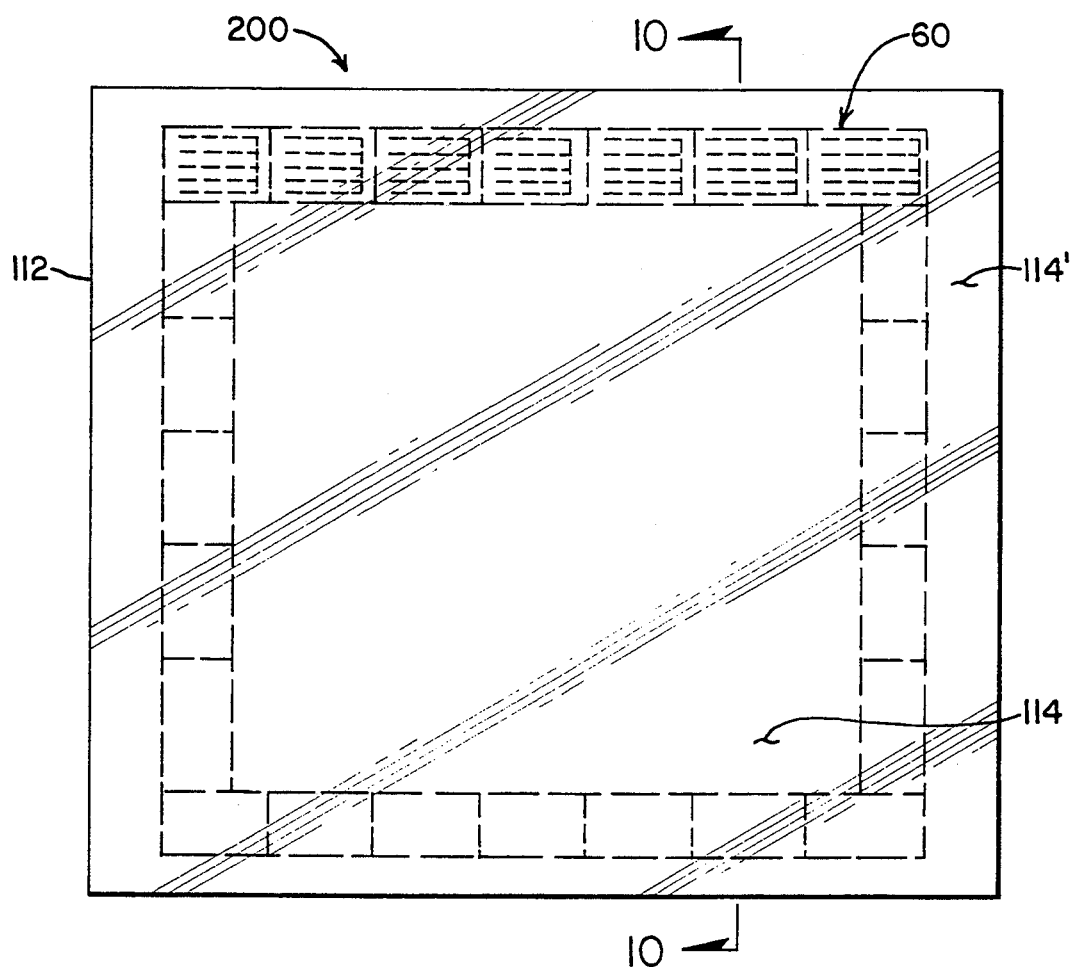
FIG. 9 is an elevation view showing the third embodiment having an array of photovoltaic cells, set off around the entire perimeter, being deposited on a thin, transparent, flexible polymer material thereby producing an integral coating.

An array of photovoltaic cells 60 is deposited on a portion of the surface 114 of the polymer material 112 along one end, as shown in FIG. 7. An electrochromic coating 16 is then deposited on the remaining surface 114, thus completely surrounding the photovoltaic array 60, as shown in FIG. 7 and more clearly in FIG. 8. Leads 32-35 are connected to the photovoltaic array 60 and electrochromic layer 16 in the same fashion as described above for the preferred embodiment, and similarly to leads 32'-35', respectively, that originate from control box 90.

Alternate embodiment 200 is constructed in the same manner as alternate embodiment 100 except that the photovoltaic array 60 is deposited in a continuous loop a spaced distance inward from the perimeter of the surface 114 of polymer material 112. Depositing photovoltaic array 60 in this manner creates two separate surface areas, the inner surface area 114 and the outer perimeter surface area 114' on which electrochromic coatings 16 and 16' are deposited, respectively. In turn, leads 32 and 33, which are connected to terminals 28 and 30, respectively, are also connected to terminals 28' and 30', respectively. Terminals 28' and 30', are in turn connected to the electrochromic coating 16' deposited on the outer perimeter surface 114'. Alternate embodiment 200 is advantageously used where, due to architectural design, the incidental sunlight 70 is obstructed from falling on the entire window surface at one time. Photovoltaic array 60, when laid out in a rectangular loop configuration, increases the probability that some incidental sunlight 70 will strike a portion of the photovoltaic array 60, even when another portion of the same is shaded.

As discussed above, the photovoltaic arrays 60 of the above-described embodiments are set off from the edges so that the outer perimeter of the surface area 114' may be trimmed to fit an existing window. Once trimmed to a desired window size, the electrochromic panel 200 can be adhered to the surface of the window (not shown). Well-known adhesives can be used, including those that are typically provided with peel-off protective sheets during storage and transportation. Control box 90 can be placed in an accessible position, and leads 32'-35', which run from control box 90, can be connected to leads 32-35, respectively. Once adhered in place on a window and hooked up as described above, the electrochromic panel 200 can be used to selectively vary opacity or transparency of the window.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Window apparatus comprising:
    a sheet of transparent material having a surface, a first portion of which surface has electrochromic opacity varying means for varying effective radiation transmittance of said first portion of said sheet in response to an electric field, and a second portion of which surface has photovoltaic electric field producing means deposited on said surface that absorbs incident light to produce an electric field; and
    circuit means connected to said photovoltaic electric field producing means deposited on said second portion of said surface of said sheet and to said electrochromic opacity varying means in such manner that an electric field produced by said photovoltaic means in response to light incident on said second surface portion of said sheet is applied to said electrochromic opacity varying means on said first portion of said surface to vary the effective light transmittance of said first portion of said surface of said sheet in response to said light incident on said second portion of said surface of said sheet.

2. The window apparatus of claim 1, wherein said transparent material comprises glass.

3. The window apparatus of claim 1, wherein said transparent material comprises a flexible plastic material.

4. The window apparatus of claim 1, wherein said photovoltaic electric field producing means, includes a photosensitive semiconductor deposited on said second portion of said surface for producing said electric field in response to irradiation by light energy.

5. The window apparatus of claim 1, wherein said electrochromic opacity varying means includes a layer of electrochromic material, a layer of electrolyte material, an ion storage layer, and two separate layers of electrically conductive material, said layer of electrochromic material and electrolyte material being sandwiched between said two layers of electrically conductive material, and said circuit means being connected to said two layers of electrically conductive material in a manner that allows an electric field to be applied in reversible polarity across said electrochromic and ion storage layers.

6. The window apparatus of claim 1, wherein said photovoltaic electric field producing means is deposited on a loop-shaped portion of said sheet a distance spaced inwardly from the perimeter of said sheet.

7. The window apparatus of claim 1, wherein said circuit means includes switch means for reversing polarity of the electric field applied to said electrochromic opacity varying means.

8. The window apparatus of claim 7, wherein said circuit means includes alternate electric field producing means, and wherein said switch means is also connected to said alternate electric field producing means for selectively connecting said alternate electric field producing means to said electrochromic opacity varying means.

9. The window apparatus of claim 8, wherein said alternate electric field producing means includes a battery.

10. The window apparatus of claim 9, wherein said battery is rechargeable by an electric field produced by said photovoltaic electric field producing means deposited on said second portion of said surface of said sheet.

11. The window apparatus of claim 1, including:
a first pane comprising said sheet of transparent material, said electrochromic opacity varying means, and said photovoltaic electric field producing means;
a second pane comprising another sheet of transparent material positioned parallel to and a distance spaced apart from said first pane in such a manner that said surface of said first pane that contains said electrochromic opacity varying means and said photovoltaic electric field producing means is positioned in facing juxtaposed relation to said second pane; and
a spacer rim positioned between the perimeter edges of said first and second panes to enclose a chamber between said first and second panes.

12. The window apparatus of claim 11, wherein said spacer rim has a channel-shaped cross-section that encloses a compartment with apertures connecting said chamber and said compartment, and a dessicant material positioned in said compartment.

13. The window apparatus of claim 11, wherein said first pane is spaced about 10 to 15 mm apart from said second pane.

14. Window apparatus comprising:
a sheet of transparent material having a surface, electrochromic opacity varying means on a portion of the surface of said sheet for varying the effective radiation transmittance of said sheet;
photovoltaic electric power producing means deposited on another portion of the surface of said sheet for producing electric power; and
circuit means connected to said photovoltaic electric power producing means and to said electrochromic opacity varying means for applying electric power produced by said photovoltaic electric power producing means across said electrochromic opacity varying means and thereby to vary the effective transmittance of said sheet, said circuit means including alternate electric power source means for providing alternative electric power as a selectable substitute for said photovoltaic electric power producing means, and switch means for reversing polarity of the electric power applied to said electrochromic opacity varying means as well as for selectively connecting said alternate electric power source means to said electrochromic opacity varying means.

15. The window apparatus of claim 14, wherein said alternate electric power source means includes a battery.

16. The window apparatus of claim 15, wherein said battery is rechargeable with electric power produced by said photovoltaic electric power producing means.

17. Window apparatus comprising:
a first pane comprising a sheet of transparent material having a surface, electrochromic opacity varying means on a portion of the surface of said sheet for varying the effective radiation transmittance of said sheet;
photovoltaic electric power producing means deposited on another portion of the surface of said sheet for producing electric power;
circuit means connected to said photovoltaic electric power producing means and to said electrochromic opacity varying means for applying electric power produced by said photovoltaic electric power producing means across said electrochromic opacity varying means and thereby to vary the effective transmittance of said sheet;
a second pane comprising another sheet of transparent material positioned parallel to and about 10 to 15 mm apart from said first pane, said surface of said first pane that contains said electrochromic opacity varying means and said photovoltaic electric power producing means being positioned in facing juxtaposed relation to said second pane; and
a spacer rim having a channel-shaped with a compartment therein positioned between the perimeter edges of said first and second panes to enclose a chamber between said first and second panes, a desiccant positioned in said compartment, and said rim having apertures opening said compartment to said chamber.

* * * * *